_United States Patent_ [19]

Link

[11] 3,933,061

[45] Jan. 20, 1976

[54] APPARATUS FOR HYDRAULICALLY OPERATING THE CHUCK OF THE HOLLOW SPINDLE OF A LATHE

[75] Inventor: Helmut Link, Esslingen, Germany

[73] Assignee: Index-Werke KG Hahn & Tessky, Esslingen, Germany

[22] Filed: July 5, 1974

[21] Appl. No.: 485,781

[30] Foreign Application Priority Data

July 10, 1973  Germany............................ 2334940

[52] U.S. Cl......................................... 82/30; 279/4
[51] Int. Cl......................... B23b 19/02; B23b 5/22
[58] Field of Search............................. 82/30; 279/4

[56] References Cited
UNITED STATES PATENTS

| | | | |
|---|---|---|---|
| 2,809,612 | 10/1957 | Highberg | 279/4 X |
| 3,439,925 | 4/1969 | Sampson | 279/4 |
| 3,807,259 | 4/1974 | Buck | 82/30 |

*Primary Examiner*—Leonidas Vlachos

[57] ABSTRACT

A hydraulic double acting chuck motor comprising a hollow cylinder and piston mounted at the rear end of a working spindle of a lathe operates a collet or chuck by pushing or pulling on a hollow operating shaft. The chuck motor is arranged in an enclosed housing attached to the rear end of the head stock of the lathe and which is fitted with a drainage connection. The hollow piston of the chuck motor is operatively controlled through a hollow cylinder extension attached to the cylinder and which is provided with a pair of fluid supply ducts, each of which communicates with a chamber of the chuck motor. The ducts open on the outer peripheral surface of the cylinder extension. A slidable annular collar surrounds the cylinder extension and defines therewith an annular space. The collar is connected by a conduit to a source of fluid under pressure and is axially shiftable by a control means into communication with one or the other of the openings to the ducts leading to the chambers of the chuck motor.

9 Claims, 3 Drawing Figures

APPARATUS FOR HYDRAULICALLY OPERATING THE CHUCK OF THE HOLLOW SPINDLE OF A LATHE

BACKGROUND OF THE INVENTION

The present invention relates to automatic lathes having a hollow spindle for receiving an elongated workpiece and in particular to means for hydraulically operating a chuck located within the mouth of the spindle for selectively clamping the workpiece.

It has been known to provide a hollow spindle with a collet or a chuck which is operable by an axially movable hollow shaft located within the spindle and which is selectively reciprocated by a hollow tubular hydraulic double action chuck motor. The hollow central passage of the operating shaft and of the chuck motor make it possible for the lathe to receive an elongated workpiece. In general the hollow chuck motor is located in a housing fixed on the supporting wall for the lathe spindle and comprises a hollow cylinder rotatable conjointly with the spindle and a hollow piston connected to the shaft. The cylinder and piston provide a double acting hydraulic mechanism capable of pushing and pulling on the shaft dependent upon the supply of hydraulic media, such as oil or the like to the respective chambers of the cylinder. To supply such hydraulic media, the cylinder of the chuck motor is provided with a hollow cylindrical extension axially arranged therewith in which two supply ducts are formed, communicating respectively with the chambers of the chuck motor. The supply ducts open on the periphery of the cylinder extension and are axially offset with respect to each other. Surrounding the cylinder extension are two annular fluid connecting members fixed by suitable means to the surrounding housing. Each of the two annular connecting members are in communication with a source of hydraulic fluid under pressure by suitable conduit means. The cylinder extension is journaled in a suitable roller bearing fixed within the housing to pass rotatably through the fluid connecting members. Each of the fluid connecting members is provided on its inner surface with a ring-shaped groove aligned in a transverse plane with the respective opening of one of the supply ducts. A slide valve is interposed in the conduits leading from the connecting members to the source of hydraulic fluid so that the flow of fluid can be regulated and controlled to one or the other of the connecting members and thereby to one or the other of the pressure chambers of the chuck motor.

In order to insure that the supply of the pressurized fluid medium is properly delivered to the correct chamber of the chuck motor, the hollow cylinder extension must be journaled within the fluid connecting members precisely. As a result a small bearing gap is created between the stationery annular fluid connecting members and the rotating cylinder extension. Due to the arrangement of the ring-shaped grooves a total of three such annular bearing gaps is formed. These gaps are sealed by the passage of hydraulic fluid medium axially outward between the stationery and rotating members. To maintain this precise arrangement relatively large diameter roller bearings are required. As a result of such construction severe limits are set to the spindle velocity so that the high rotational speeds required in modern automatic lathes cannot be obtained. Moreover, the pressurized hydraulic media flowing through the bearing gaps becomes overheated at high rotational speeds, so that the energy used to heat the hydraulic fluid tends to significantly reduce the working torque of the spindle. It would indeed be possible to provide better operating conditions, in this respect, by increasing the cross section of the bearing gaps, however, this would cause a flow of large volume of hydraulic fluid through the roller bearings which would also result in an inadmissible heating of the hydraulic fluid.

It is the object of the present invention to provide a lathe of the type described which is provided with means for hydraulically actuating the chuck in which the disadvantages and defects of the prior art constructions are avoided.

It is a further object of the present invention to provide apparatus of the type described which permits extremely high rotational speed of the working spindle while avoiding excessive heating and torque loss.

It is a further object of the present invention to provide apparatus of the type described which is simpler in design and more economical to construct and to use than the prior devices. It is still another object of the present invention to provide apparatus of the type described wherein loss of operating capacity is prevented even in the event of large leakage of hydraulic fluid, due to storage, occurs.

The foregoing objects, other objects, together with numerous advantages of the present invention are set forth and will be apparent from the following disclosure.

SUMMARY OF THE INVENTION

According to the present invention an annular collar having a radially inwardly directed flange at each end is slidably mounted about the cylinder extension. The collar defines with the outer surface of the cylinder extension an annular space bounded by the flanges which form a bearing gap at each end of the space. The annular space is in communication with the source of pressurized hydraulic fluid, such as oil, by a flexible conduit connected to the annular collar. Actuating means such as a small hydraulic motor is provided to axially shift the collar from one duct opening to the other so that the pressurized hydraulic fluid can be selectively supplied to one or the other chamber of the chuck motor.

With the foregoing design, a fixed installation of the fluid connecting members to the surrounding housing is avoided and therefore the use of roller bearings are no longer needed to precisely journal the rotating cylinder extension within the connecting members. Indeed, the slidable collar, replacing the fixed connecting members, also forms an accurate slide valve, carried by the cylinder extension itself, for controlling the flow of pressurized fluid to the chuck motor. With this form of construction, it is possible therefore to dispense with stationary surrounding parts and heavy pillow block means for roller bearings. Further, the diameter of the cylinder extension can be maintained much smaller than heretofore required since the slidable collar is carried by the extension hydrostatically because of the flow of hydraulic fluid through the narrow bearing gaps formed between the radial flanges and the surface of the cylinder extension. To a large extent a hydraulic centering effect is obtained by the continual leakage of the hydraulic fluid through the bearing gap. Even with a relatively large leakage of hydraulic fluid the capacity for operation of the chuck motor is in no way impaired, as the structure of the present invention permits a high systemic pressure of any level. This in turn makes it possible to produce the required working pressures within the chambers of the chuck motor with relatively small piston diameters. As a result it is possible to make the structure of the present invention with extremely small dimensions.

Because of the reduction in the diameter of the cylinder of the chuck motor, made possible by the present invention, and in particular because of the reduction of the diameter of the cylinder extension, the masses to be moved for control of the chuck motor are significantly reduced. Consequently there is a significant reduction in the power requirement for the spindle drive rotating the spindle. A further important advantage of the present invention resides in the fact that, during the roation of the working spindle considerably less heat is developed than in the heretofore known designs. The reason for this reduction in heat arises from the fact that the slidable collar, unlike the fixed annular fluid connecting members has only two bearing gaps, which are in the form of annular rings.

Since further, the annular collar also forms a slide valve, it is no longer necessary, in contrast to the known devices, to provide a separate exterior way valve in the supply conduits from the pressure source to the annular fluid contacting members. The pressurized hydraulic fluid which is exhausted from the non-pressurized chamber of the chuck motor, can flow directly into the housing rather than into the return pipes necessary in the prior designs. This arrangement leads to a significantly smaller flow loss of hydraulic fluid which, with the altogether higher pressure level in combination in particular with a low clutch motor clamping pressure, greatly shorten the otherwise normally very long loading and unloading times of the clutch motor.

The actuating means for shifting the slidable collar between the duct openings may be of any design. It is, however, particularly favorable for the slide adjustment to be of a hydraulic nature so that in a preferred embodiment it may be formed by a cylinder and piston unit to which a pre-control valve is connected in series. The slidable collar thus forms together with the cylinder piston unit, to some extent, a main valve which can be controlled with a very small servo control valve. Moreover, the cylinder unit serving to adjust the slidable collar can be made extremely small due to the fact that the quasi-hydrostatic mounting of the slide collar requires only a very small or slight adjustment force to effect the proper shifting.

In order to pass the pressurized hydraulic fluid to the two chambers of the chuck motor it is advantageous to provide each chamber with several supply ducts. A plurality of ducts arranged parallel to the axis of the cylinder extension and having their openings in the same transverse plane will enable the effective filling and emptying of the chuck motor chambers as quickly as possible. Further, a simple construction is provided wherein the chuck motor is formed from an annular cylindrical chamber and a piston formed by a hollow tube having a radially outwardly extending flange located within the cylinder chamber. The cylinder extension extends axially away from the piston. In this construction it would be an advantageous design if the supply ducts through the cylinder extension are connected with the cylinder chamber formed on the far side of the piston flange by individual tubes passing through the piston flange and arranged with their axes parallel to the axis of the cylinder. The communication of this far sided cylinder chamber can thus be maintained in an axial direction without any angular deviation in the flow of the hydraulic fluid. Thus relatively small flow losses will occur. At the same time the connecting tubes prevent the rotation or twisting of the hollow piston within the cylinder chamber.

It is further advantageous to provide the radial flanges of the slide collar with bearing surfaces opposite the peripheral surface of the cylinder extension so that they taper conically in the direction of the flow of the hydraulic medium. That is the outer axial ends of the bearing gaps are smaller than the inner axial ends thereof. By shaping the bearing surfaces in this manner a particularly intensive centering effect is obtained. The cross section of the bearing gaps maintain a more uniform, equal spacing, automatically and of its own accord in all of the peripheral zones and make any contact between the gap forming inner edge of the flanges of the slide collar and the peripheral surface of the cylinder extension impossible.

Full details of the present invention are set forth in the following description of its preferred embodiment and in the practical example represented in the drawing.

DESCRIPTION OF THE INVENTION

Figure 1:
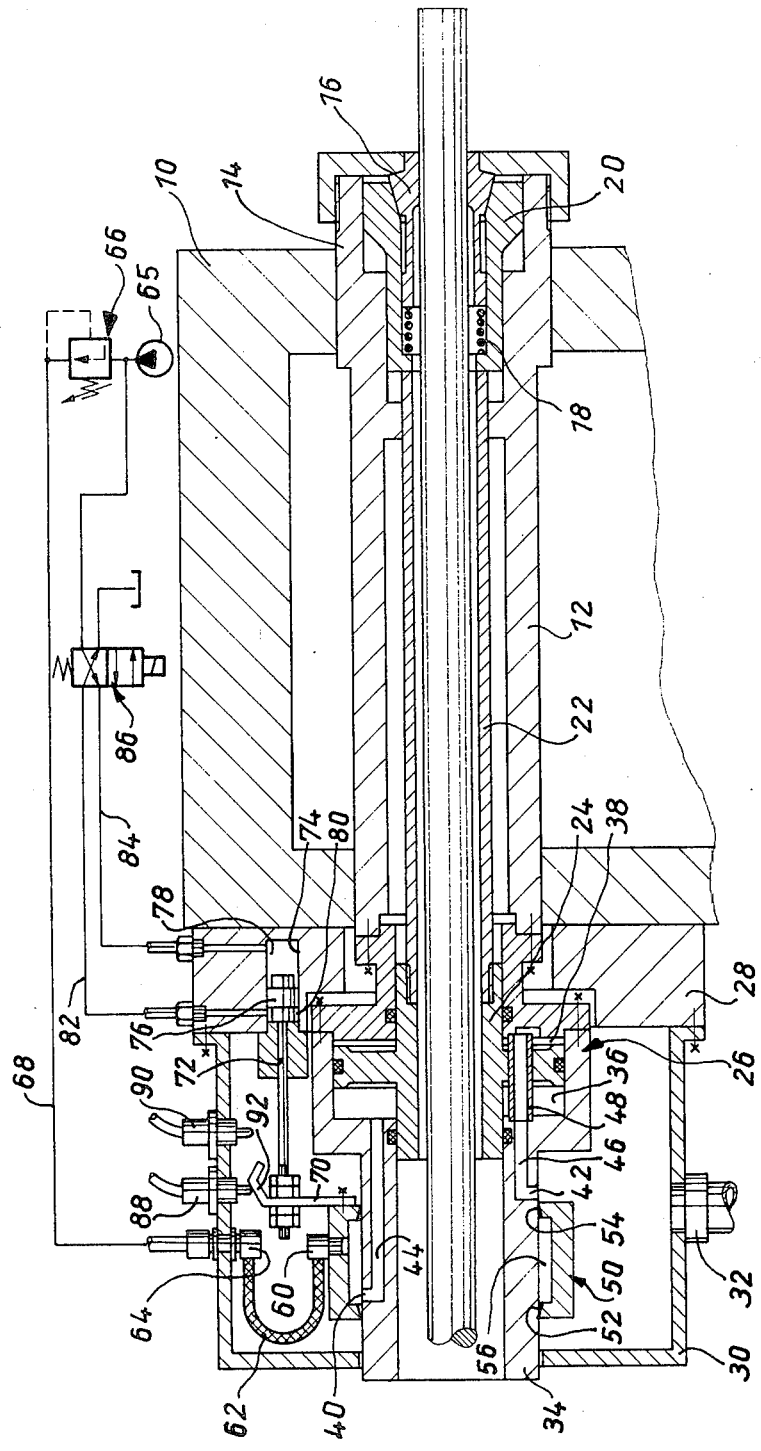
FIG. 1 is a longitudinal sectional view through the head stock of a lathe showing a working spindle equipped with the chuck motor and control means of the present invention.

In FIG. 1 the head stock of an automatic lathe, generally denoted by the numeral 10, is shown in which a working rotatable spindle 12 is mounted. At the head end 14 of the spindle 12 there is inserted a collet or chuck 16 which can be clamped or opened in the well known manner by its axial movement. A compression spring 18 is coordinated with the chuck so as to normally bias the chuck in its open position. Surrounding the chuck 16 is a pressure sleeve 20 against which is abutted the end of an elongated actuating shaft 22 which extends through the spindle 12. The actuating shaft 22 is mounted to be axially movable within the spindle. The rear end of the hollow actuatitng shaft 22 is keyed to a hollow piston 24 located within the cylinder of a double acting chuck motor generally denoted by the numeral 26. The cylinder of the chuck motor is flanged and secured to the rear end of the spindle coaxially with the latter so as to be rotatable conjointly therewith. The spindle extends through an assembly plate on the rear wall of the head stock 10 and the hollow chuck motor is located inside a housing 30 secured to the assembly plate 28. The housing 30 is provided with an oil drainage connection 32 on its lower wall.

The cylinder of the chuck motor 26 is provided with a hollow cylinder extension 34 on its rearward end facing away from the spindle. The piston 24 comprises a hollow tube having a radially outwardly extending flange-like or disc member extending within the cylinder 26. The hollow piston 24 thus divides the cylinder 26 into two pressure chambers 36 and 38. Leading respectively to each of the pressure chambers 36 and 38 are two sets of ducts formed in the cylinder extension 34. One set of ducts comprise openings 40 facing radially outward on the outer periphery of the cylindrical extension 34 to which are connected uniformly spaced axially extending parallel ducts 44 which open into the pressure chamber 36. The other set of ducts comprise openings 42 also radially outward to the outer periphery of the extension 34 and corresponding axially aligned parallel ducts 46. The ducts 46 are connected to tubular connecting members 48 which pass freely through the flange of the piston 24 to the opposite or far pressure chamber 38. Whereas the supply ducts 44 form a direct communication with the pressure chamber 36 the supply ducts 46 are indirectly connected by the tubular members 48 to the pressure chamber 38. These tubular connectors 48 serve also to prevent twisting or rotation of the hollow piston 34 by freely extending parallel to the axis of the piston 24 through its radially outer flange.

In order to control the flow of hydraulic fluid, such as oil, into one or the other of the cylinder chambers 36 and 38, a connecting member in the form of an axially movable slide collar 50 is arranged about the cylinder extension 34. The slide collar 50 is axially movable but is held against rotation relative to the cylinder extension as will be later described. The slide collar is provided with radially inwardly extending flanges 52 and 54 at each of its axial ends so as to define with the outer surface of the cylinder extension 34 an annular ring-shaped space 52. The inner edge surfaces of the flanges 52 and 54 are spaced from the surface of the cylinder extension 34 so as to provide a very small ring-shaped bearing gap. As seen more clearly in FIG. 2 the openings 40 and 42 of the two sets of ducts extending through the cylinder extension lie in respective transverse planes to the axis of the spindle, which planes are axially offset from each other. The axial length of the slidable collar 50 is maintained less than the axial distance between the transverse planes in which the openings 40 and 42 lie so that only one is communicated with at a time. The annular space 56 communicates with a source of fluid under pressure by a connecting nipple 60 secured to the slide collar 50, a flexible conduit 62, and a connecting nipple 64 secured in the wall of the surrounding housing 30. A suitable conduit 68 extends from the fixed nipple 64 to a hydraulic pump 65 via an adjustable regulating valve 66, which serves to adjust the required pressure of the hydraulic fluid.

The slidable collar 50 is shifted over the selected ducts 40 or 42 by actuating means comprising an arm 70 secured to the flange 54 of the collar. The arm 70 is connected to the end of a piston rod 72 extending from a piston 76 located in a hydraulic cylinder 74 provided with a pair of opposed cylinder chambers 78 and 80. The cylinders 78 and 80 are connected via corresponding conduits 82 and 84 with a servo-control valve 86 connected to the pump 65 with a return to the fluid reservoir. The servo valve may be hydraulically, pneumatically or even electromagnetically controlled to provide selective operation and passage of hydraulic fluid to the actuating means.

The connection of the collar 50 with the actuating means represented by the arm 70 and piston rod 72, maintains the collar against rotation relative to the spindle or the cylinder extension 34.

Figure 2:
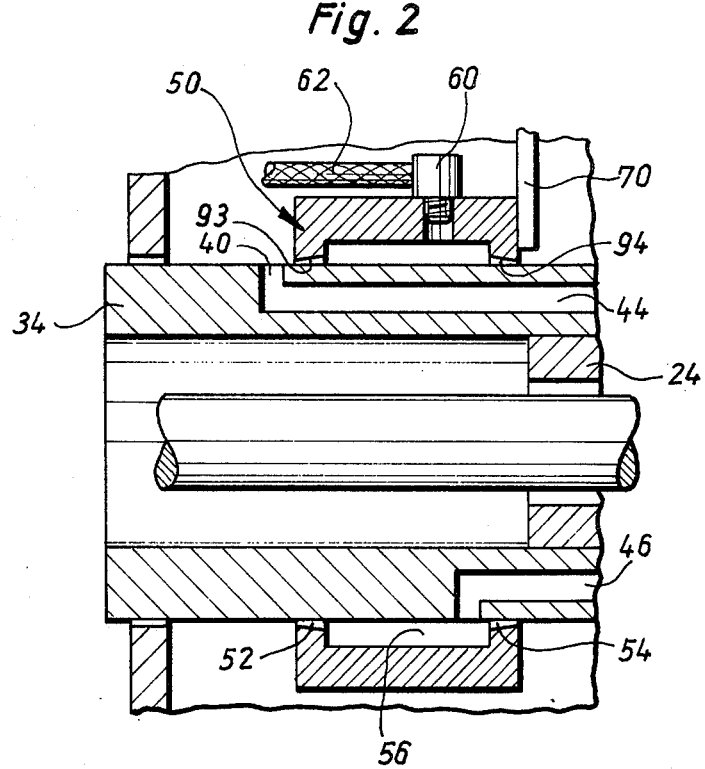
FIG. 2 is an enlarged detail view of a portion of FIG. 1 showing the structure and movement of the slide collar.

FIGS. 1 and 2 show the two extreme end positions of the slide collar 50 which end positions are at the same time the end positions of the piston 76 of the actuating means. In one position the openings 40 leading to the pressure chamber 36 of the chuck motor are exposed to the annular space 56 and thus in communication with the source of hydraulic fluid while the openings 42 to the far pressure chamber 38 are open to drainage via the surrounding housing 30 and the drainage conduit 32 (FIG. 1). In the other position the slide collar 52 exposes the openings 42 to the space 56 and thus to the hydraulic fluid under pressure while opening the openings 40 to drainage via the housing and the conduit 32 (FIG. 2). The extreme positions of the slide collar 50 are monitored by two switches 88 and 90 mounted in the wall of the housing on the plane of the driver arm 70 and at an appropriate distance from one another. The arm 70 secured to the collar 50 is provided at its free end with a curved portion 92 which is adapted to engage the movable member of the switches 88 and 90. While the slidable collar is prevented from rotation relative to the axis of the spindle it is freely movable axially with respect to the cylinder extension so as to easily control the flow of hydraulic fluid under pressure from the pump 65 through the flexible conduit 62 into either one of the pressure chambers 36 and 38. Because the dimension of the slidable collar 50 is less than the axial distance between the openings 40 and 42 fluid under pressure can be delivered only to one of the pressure chambers.

As seen more clearly in FIG. 2 the inner edge surfaces 93 and 94 of the flanges 52 and 54 respectively are tapered in the direction of the fluid pressure in the annular space 56. That is, the conical taper of the surfaces 93 and 94 is such that their outer edges has a smaller diameter than their inner edges. As a result of this taper the hydrostatic fluid effect between the edges of the flanges and the outer surface of the cylinder extension 34 is created. This maintains, as previously described the collar 50 in a uniform and equal spacing concentrically about this outer peripheral surface of the cylinder extension 34 and causes the collar 50 to ride easily on a fluid film. Consequently, the actuating means for axially shifting the collar 50 can be relatively small as previously described and the corresponding dimensions of the cylindrical extension can likewise be relatively small.

Operation of the device described is as follows:

In each of the two end positions of the slidable collar 50 shown respectively in FIGS. 1 and 2, either the openings 40 or 42 of the supply ducts 44 or 46 are exposed to the annular space 56. Hydraulic pressurized fluid is continuously supplied via the conduit 68 and the flexible conduit 62 to the chamber 56 so that it can immediately flow into one or the other of the pressure chambers 36 or 38. Because the nonpressurized chamber 36 or 38 is simultaneously open to the surrounding housing 30 the compressed oil exhausted during the movement of the piston 24 caused by the introduction of the pressurized hydraulic fluid into the other chamber, passes outwardly of the respective duct and may be drained through the connection 32 to the fluid reservoir. As indicated above the slide collar 50 is arranged axially movable on the cylindrical extension, however the conical taper of the edges 93 and 94, in the direction of the flow of pressurized oil has the effect of sealing the chamber 56 and enables a small drainage stream to continuously flow through the bearing gaps. This continuous drainage stream automatically acts to create a bearing film causing the collar 50 to be centered exactly concentrically about the cylinder extension 34. The cross section of the bearing gap is maintained equal throughout the periphery of the gap and throughout the operation of the apparatus. There can therefore be no metal to metal contact of the elements forming the bearing gap. Furthermore to some extent the hydrostatic support of the slide collar 50 created by the hydraulic film enables the axial shifting and adjustment of the slide collar to be effected with an extremely small expenditure of force. For this reason the actuating unit formed by the cylinder 74 and the piston 76 can be made relatively small. The servo control valve 86 can similarly be designed in extremely small dimensions.

Figure 3:
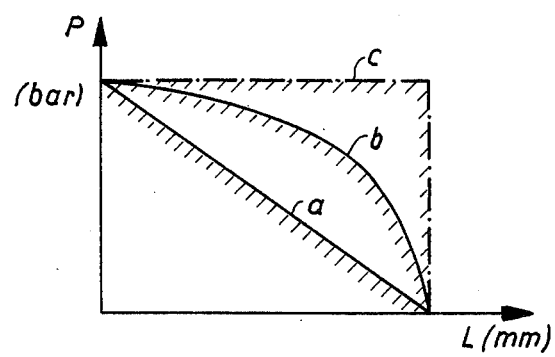
FIG. 3 is a graph illustrating the pressure curves of differently designed bearing gaps between the slide collar and the peripheral surface of the cylinder extension.

FIG. 3 shows the pressure curves of differently designed bearing surfaces 93 and 94 formed on the flange edges of the slide collar 50. It will be evident from this graph that the conical design selected for the bearing surfaces 93 and 94 can be made to provide optimum bearing conditions, since the centering effect is based upon the fact that the pressure gradient of a lamina gap flow increases with the third power of the gap height.

The pressure diagram in FIG. 3 shows three curves; curve a formed by a cylindrical shaped bearing gap having a surface 93 or 94 parallel to the peripheral surface of the cylinder extension 34, a curve b formed with a preferred tapering surface 93 or 94 having a small gap at its outer edge, and a curve c in which the peripheral surfaces of the collar flanges have a tapering surface in which the outer edge has a narrowest point barely in contact with the peripheral surface of the cylinder extension. According to the present invention it is preferable to form the surfaces 93 and 94 in such a way that they correspond to the pressure conditions developed under the curve b. That is, they are formed throughout the length of their surface with a conical taper having a small but not minimal gap to provide a liquid pressure curve which brings about the desired centering of the slide under automatic or self-regulating conditions.

The arrangement of the slidable collar on the cylinder extension and the special nature of its mounting enable an optimal choice of the amount of drainage fluid and fluid pressure drop to be made so that only a slight amount of heat is generated in the fluid between the rotating cylinder extension 34 and the axially movable but rotatably stationary slidable collar 50. Since the slide collar is carried solely by the hollow cylinder extension itself it is possible to keep it small in diameter. Thus a smaller power requirement for mass acceleration of the chuck motor is required. It is moreover possible to operate the chuck motor at high pressures, as a result of which the cross section of the chuck motor cylinder chambers can be made as small as possible since reduced volumes of fluid are necessary to operate the clutch motor. This again can be utilized advantageously to shorten the switching times and the times necessary to load and unload the pressure chambers of the chuck motor.

It will be seen from the foregoing description that the objects and advantages enumerated earlier in the specification have been easily and advantageously obtained. Various changes, modifications and alternate embodiments have been suggested in the description, other modifications and changes will be obvious to those skilled in the present art. It is intended therefore that the present disclosure be taken as illustrative only and not as limiting of the present invention.

What is claimed is:

1. In a lathe having a hollow spindle for receiving an elongated workpiece, an axially operable chuck located at its forward end for selectively clamping said workpiece, a hollow shaft located within said spindle and axially reciprocal with respect to said spindle to operate said chuck, a double acting chuck motor comprising a cylinder secured to said spindle and a piston secured to said hollow shaft, said cylinder having two pressure chambers and a cylinder extension coaxially extending to the rear thereof, first duct means in said extension communicating with one of the pressure chambers, second duct means within said extension communicating with the other pressure chamber, each of said ducts having an opening on the peripheral surface of said cylinder extension axially offset from each other, a slidable sleeve surrounding said cylinder extension, said slidable sleeve having radially inwardly directed flanges along its axial edges defining with said extension member an annular space, conduit means secured to said sleeve connecting said space to a source of fluid under pressure, and means for axially shifting said sleeve between the first and second duct means to selectively supply fluid under pressure to one or the other of said pressure chambers thereby actuating said piston to reciprocate said shaft and operate said chuck.

2. The apparatus according to claim 1 including an enclosed housing surrounding said cylinder and cylinder extension for receiving hydraulic fluid from said chuck motor and an exit port for draining said hydraulic fluid from said housing.

3. The apparatus according to claim 1 wherein the cylinder of said chuck motor comprises an annular hollow ring open at its inner wall and said piston comprises a tubular member axially aligned on the end of said operating shaft and having a radially outward annular flange extending within said hollow ring, said piston tube forming the inner wall of said cylinder and being slidably sealed therewith.

4. The apparatus according to claim 1 wherein the bearing surfaces of said slide collar define with the peripheral surface of the cylinder extension bearing gaps and are tapered conically inwardly in the direction of flow of the hydraulic fluid through said space.

5. The apparatus according to claim 4 wherein the axial length of the bearing surfaces of said slide collar are substantially equal.

6. The apparatus according to claim 4 wherein the taper of the bearing surfaces of slide collar are substantially equal to each other.

7. The apparatus according to claim 1 wherein said slide collar actuating means comprises a cylinder and piston and is provided with servo control valve interposed between said cylinder and the source of fluid under pressure.

8. The apparatus according to claim 1 including a flexible conduit connecting said slide collar to the source of hydraulic fluid.

9. The apparatus according to claim 1 wherein said cylinder extension lies axially to one side of said chuck motor adjacent one chamber thereof and said chuck motor includes at least one tube arranged along an axis parallel to the central axis of said piston through said piston in communication with the other chamber and the supply ducts located in said cylinder extension.

* * * * *